United States Patent
Bichot et al.

(10) Patent No.: US 8,204,055 B2
(45) Date of Patent: Jun. 19, 2012

(54) MULTICAST OVER UNICAST IN A NETWORK

(75) Inventors: Guillaume Bichot, La Chapell Chaussee (FR); Junbiao Zhang, Bridgewater, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 438 days.

(21) Appl. No.: 10/572,818

(22) PCT Filed: Oct. 6, 2004

(86) PCT No.: PCT/US2004/032963
§ 371 (c)(1), (2), (4) Date: Mar. 22, 2006

(87) PCT Pub. No.: WO2005/036818
PCT Pub. Date: Apr. 21, 2005

(65) Prior Publication Data
US 2007/0002858 A1 Jan. 4, 2007

Related U.S. Application Data

(60) Provisional application No. 60/509,325, filed on Oct. 7, 2003.

(51) Int. Cl.
*H04L 12/56* (2006.01)
(52) U.S. Cl. ........ 370/390; 370/310; 370/256; 370/312; 370/218
(58) Field of Classification Search .................. 370/390, 370/310, 312, 341, 256, 218
See application file for complete search history.

(56) References Cited

U.S. PATENT DOCUMENTS

| | | | | |
|---|---|---|---|---|
| 6,011,782 | A * | 1/2000 | DeSimone et al. | 370/260 |
| 6,047,330 | A * | 4/2000 | Stracke, Jr. | 709/238 |
| 6,909,708 | B1 * | 6/2005 | Krishnaswamy et al. | 370/352 |

(Continued)

FOREIGN PATENT DOCUMENTS

EP 0902569 3/1999

(Continued)

OTHER PUBLICATIONS

Search report dated Jan. 21, 2005.

*Primary Examiner* — Huy D Vu
*Assistant Examiner* — Zewdu A Beyen
(74) *Attorney, Agent, or Firm* — Robert D. Shedd; Jeffrey M. Navon; Jerome G. Schaefer

(57) ABSTRACT

A method is described for receiving a multicast in user devices in a network issuing a request to join a multicast group, identifying multicast data packets associated with the multicast group, monitoring transmissions of the multicast data packets to determine whether the identified multicast data packets are being transmitted in an already established unicast session and establishing a unicast session and processing multicast data packets if an already established unicast session does not exist A method is described for receiving a multicast transmission in user devices in a network establishing a unicast session with a dedicated terminal, identifying multicast data packets associated with a multicast group, monitoring transmissions of the multicast data packets and processing the multicast data packets by the dedicated terminal. Additonally, an apparatus is described for accepting a request to join a multicast group, for identifying multicast data packets associated with the multicast group, establishing a unicast session, for encapsulating said multicast data packets in a unicast frame and for forwarding the unicast frame via the unicast session.

16 Claims, 4 Drawing Sheets

U.S. PATENT DOCUMENTS

| | | | |
|---|---|---|---|
| 6,973,081 B1 * | 12/2005 | Patel | 370/390 |
| 7,082,142 B1 * | 7/2006 | Begeja | 370/507 |
| 7,106,735 B2 * | 9/2006 | Yagyu et al. | 370/390 |
| 7,269,182 B1 * | 9/2007 | Carrel et al. | 370/432 |
| 7,281,058 B1 * | 10/2007 | Shepherd et al. | 709/238 |
| 7,373,394 B1 * | 5/2008 | Li et al. | 709/219 |
| 7,423,973 B2 * | 9/2008 | Chen et al. | 370/238 |
| 7,546,355 B2 * | 6/2009 | Kalnitsky | 709/219 |
| 2001/0049291 A1 | 12/2001 | Sato et al. | |
| 2002/0141394 A1 * | 10/2002 | Hardisty | 370/352 |
| 2002/0143951 A1 | 10/2002 | Khan et al. | |
| 2003/0026240 A1 * | 2/2003 | Eyuboglu et al. | 370/349 |
| 2003/0079022 A1 * | 4/2003 | Toporek et al. | 709/227 |
| 2003/0195964 A1 * | 10/2003 | Mane | 709/227 |
| 2003/0218980 A1 * | 11/2003 | Fukushima et al. | 370/230 |
| 2004/0013583 A1 * | 1/2004 | Burkhardt | 422/186.3 |
| 2005/0007969 A1 * | 1/2005 | Hundscheidt et al. | 370/312 |
| 2005/0044142 A1 * | 2/2005 | Garrec et al. | 709/204 |
| 2007/0028002 A1 * | 2/2007 | McCanne | 709/238 |
| 2007/0201380 A1 * | 8/2007 | Ma et al. | 370/254 |
| 2008/0317029 A1 * | 12/2008 | Tasaki et al. | 370/390 |

FOREIGN PATENT DOCUMENTS

| | | |
|---|---|---|
| JP | 2000059294 | 2/2000 |
| JP | 2000341314 | 12/2000 |
| WO | 02/079899 A2 | 10/2002 |
| WO | 02/079899 A3 | 10/2002 |
| WO | WO02098063 | 12/2002 |

* cited by examiner

MULTICAST OVER UNICAST IN A NETWORK

This application claims the benefit, under 35 U.S.C. §365 of
International Application PCT/US04/32963, filed Oct. 6, 2004, which was published in accordance with PCT Article 21(2) on Apr. 21, 2005 in English and which claims the benefit of U.S. provisional patent application No. 60/509,325, filed Oct. 7, 2003.

FIELD OF THE INVENTION

The present invention relates generally to network communications and, in particular, to a method and apparatus for communicating broadcast/multicast data via unicast sessions/connections. The invention is particularly suitable for implementation in a wireless Local Area Network (WLAN) system operating in accordance with the Institute of Electrical & Electronics Engineers' (IEEE) 802.11 standards.

BACKGROUND OF THE INVENTION

The context of the present invention is the family of wireless local area networks or WLANs based upon the IEEE 802.11 standards, which define intermediate devices (IDs) such as access points (APs), bridges, routers and brouters that provide access for mobile devices and to other networks, such as hard-wired local area and global networks, such as the Internet. Wireless receiving points utilized in access broadcast video streaming may include a set top box in a simple system, whereas in commercial rebroadcast system a transcoder/multiplexer/demultiplexer or TMD may operate in conjunction with a local video server. In receiving Internet data, a common gateway operating in a conventional Internet Protocol/Transmission Control Protocol/User Datagram Protocol (IP/TCP/UDP) protocol may be utilized.

Conventionally, the IEEE 802.11 based architecture is comprised of several components and services that interact to provide station mobility transparent to the higher layers of the network stack. The IEEE 802.11 based network defines a station as the component that connects to a wireless medium and contains the functionality of the IEEE 802.11 protocols, that being MAC (Medium Access Control), PHY (Physical Layer), and a connection to the wireless media. Typically, the IEEE 802.11 protocols are implemented in the hardware and/or software of a network interface card (NIC).

The IEEE 802.11 standards also define a Basic Service Set or BSS, which is regarded as a basic building block in WLAN architecture. The BSS consists of a group of any number of ID stations that communicate with one another. In an independent BSS, the mobile stations communicate directly with each other. In an infrastructure BSS, all stations in the BSS communicate with the ID and no longer communicate directly with the independent BSS, such that all frames are relayed between stations by the ID.

A station could be a laptop PC, handheld device, or an AP. Stations may be mobile, portable, or stationary and all stations support the IEEE 802.11 station services of authentication, de-authentication, privacy, and data delivery.

If the broadcast or multicast originator is a mobile terminal, broadcast or multicast data are first transferred from the mobile terminal to the ID in a unicast transmission. In general, a broadcast transmission is a transmission from one to all; a multicast transmission is a transmission from one to many; and a unicast transmission is from one to one. Hereinafter, broadcast and multicast will be used interchangeably.

According to the IEEE 802.11 specifications, the broadcast/multicast message may be distributed into the BSS by the ID. Regardless of the length of the frame, no RTS/CTS exchange can be used. In addition, no ACK is permitted to be transmitted to the ID by any of the recipients of the multicast/broadcast frame(s). There is no MAC-level recovery on broadcast or multicast frames sent from the ID.

Video transmissions—in particular real time transmissions—require broadcast/multicast transmissions over a network, e.g., over a WLAN. However, broadcast/multicast transmissions suffer from an inherent lack of an error correction mechanism. When a data packet is sent to a group of receivers (broadcast/multicast), it is extremely difficult, if not impossible for the transmitter to manage the retransmission protocol for each receiver.

Several mechanisms exist to overcome the data packet loss in a network, in particular in a WLAN, such as automatic forward error correction (FEC), multicast automatic repeat request (ARQ) etc. All of these mechanisms, however, suffer from significant added complexity and limitations in certain network products. For example, some WLAN intermediate devices like an Access Point (AP) or a bridge, where bridge and/or AP are used herein to include router and/or brouter or any device having equivalent functionality, have an inherent limit in the transmission rate for WLAN multicast data packets on the premise that multicast quality should be limited by the client, e.g., mobile terminal with the poorest reception (i.e., the client that is farthest away from the ID). Such a limitation dictates that even if a client is close to the ID there is no possibility for any QoS upgrade of the multicast quality.

SUMMARY OF THE INVENTION

The present invention offers network multicast/broadcast services using unicast sessions thereby profiting from the ARQ-based error correction mechanism used for a unicast connection to enhance the quality of multicast/broadcast communications to neighboring users. If a unicast session exists that uses ARQ-based error correction, then neighboring users can listen in on the unicast session and profit from the ARQ mechanism without requiring any additional unicast sessions to be initiated and maintained. Thus, normal unicast mechanisms can be leveraged to provide multicast/broadcast services without complex FEC or multicast ARQ schemes. Additionally, it is possible to accommodate a plurality of transmission rates, e.g., 1 Mbps, 2 Mbps, 5.5 Mbps and 11 Mbps. Hereinafter, the terms session and connection will be used interchangeably.

This plurality of transmission rates also addresses the near/far problem. The near/far problem is the term used to indicate that the throughput rate is lower at the edges of the cell (far) and higher closer to the intermediate device (near) and that the error correction schemes are, therefore, also different. The UDP traffic is assumed to be broadcast/multicast (e.g., video multicast). In the present invention, the UDP broadcast/multicast data packets are encapsulated into Ethernet frames for transmission via unicast sessions/connections.

A method is described for receiving a multicast in user devices in a network issuing a request to join a multicast group, identifying multicast data packets associated with the multicast group, monitoring transmissions of the multicast data packets to determine whether the identified multicast data packets are being transmitted in an already established unicast session and establishing a unicast session and processing multicast data packets if an already established unicast session does not exist. A method is described for receiving a multicast transmission in user devices in a network establishing a unicast session with a dedicated terminal, identifying multicast data packets associated with a multicast group, monitoring transmissions of the multicast data packets and processing the multicast data packets by the dedicated terminal.

Additionally, an apparatus is described for accepting a request to join a multicast group, for identifying multicast data packets associated with the multicast group, establishing a unicast session, for encapsulating said multicast data packets in a unicast frame and for forwarding the unicast frame via the unicast session. Additionally, an apparatus is described for establishing a unicast session with a multicast-to-unicast converter, for identifying multicast data packets associated with a multicast group, for encapsulating the multicast data packets in a unicast frame and for forwarding the unicast frames via the unicast session.

A method and apparatus are described for receiving a multicast/broadcast in user devices in a network, comprising receiving, by an intermediate device (ID), a request from a first user device to join a multicast group, identifying multicast/broadcast data packets associated with the multicast group, monitoring transmissions of the multicast/broadcast data packets from the ID, by the first user device, to determine whether the identified multicast/broadcast data packets are being transmitted between the ID and a second user device in an already established unicast session/connection between the second user device and the ID, processing the multicast/broadcast data packets by the second user device, if the second user device is in the already established unicast session/connection between the second user device and the ID and establishing a unicast session/connection between the first user device and the ID and switching to normal mode and processing multicast/broadcast data packets by the first user device, if one of the second user device is not in the already established unicast session/connection and the first user device is no longer in a coverage area for receiving transmissions between the second user device and the ID. Further, testing to determine if the user device is still active. If the user device is still active then continuing to receive and process multicast data packets by the user device. If the user device is not active then selecting a new user device by the ID and establishing a unicast session/connection with the newly selected user device. The newly selected user device switching to normal mode and receiving and processing multicast data packets via the newly established unicast session/connection.

In an alternative embodiment that supports multiple multicast transmission rate and the uses of dedicated terminals, a wake-up message is used to determine if the dedicated terminal is still active. Also since at least one dedicated terminal is used, there is no necessity to wait for an IGMP request for transmission of multicast packets to take place. Once a unicast session/connection is established with the at least one dedicated terminal then transmission of multicast data packets (encapsulated as Ethernet frames) occurs. Other user devices that join the multicast group can simply listen in on the unicast session(s)/connection(s). Multiple unicast sessions/connections support multiple transmission rates and may be established by establishing multiple unicast sessions between the ID.

BRIEF DESCRIPTION OF THE DRAWINGS

The invention is best understood with reference to the Detailed Description of the Preferred Embodiments and the drawings where.

DETAILED DESCRIPTION OF THE PREFERRED EMBODIMENTS

Figure 1:
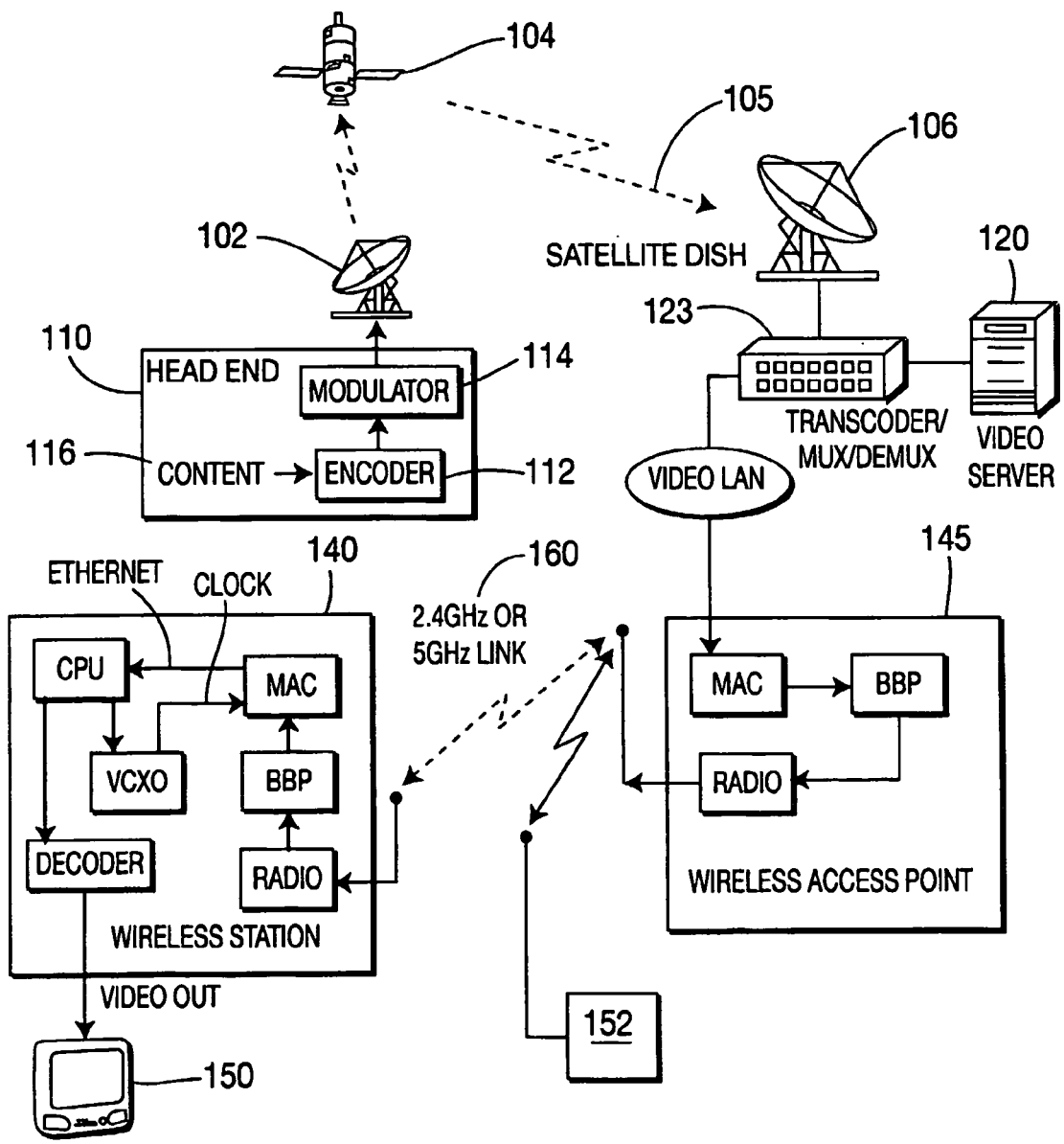
FIG. 1 illustrates an exemplary digital video and audio system suitable for implementing the present invention.
Figure 2:
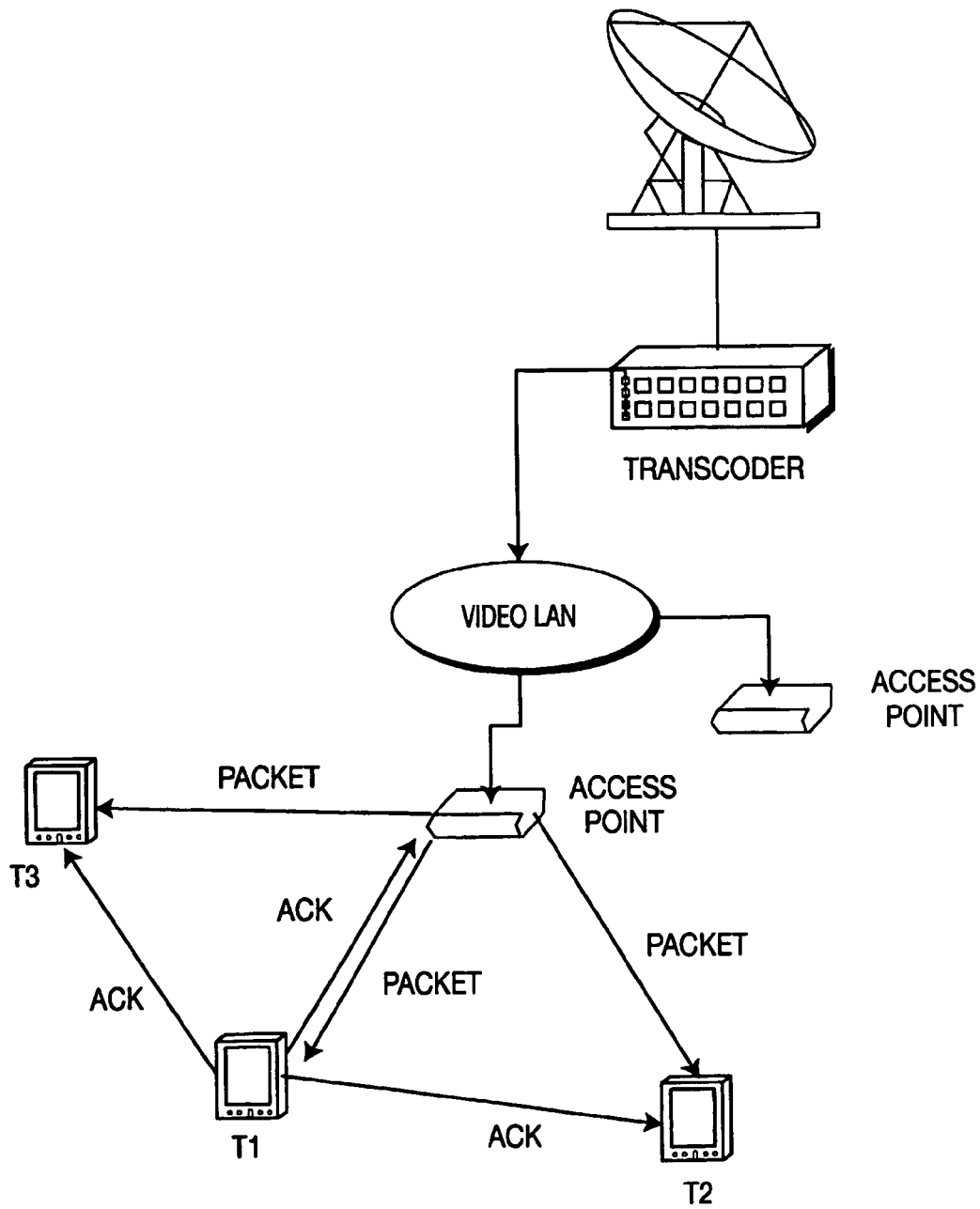
FIG. 2 is a block diagram of the present invention.

FIG. 1 illustrates an exemplary digital video and audio system suitable for implementing the present invention. At the head end a multiple video and audio content stream is converted into a digital format (typically in accordance with the MPEG-2 standard) and transmitted via, for example, satellite to a receiving dish, or other suitable means, which is attached to a receiver referred to as a set top box or other suitable means such as a TMD. U.S. Pat. No. 6,510,519, describes a representative system utilizing a head end and a set top box including tuners, de-modulators, decoders, transport de-multiplexers, microprocessors, program memories, video picture memories, MPEG video decoders, displays, and smart cards. Most digital broadcast system data streams are encoded and scrambled for security purposes at a transmitter, once decryption and decoding occur at a receiver, the system builds a video composite picture in memory and displays the desired picture synchronized with its audio component on a monitor. In addition to descrambling the program, generally, further authorizations are provided to insure that the particular receiver has been enabled to receive a program or a set of programs.

As further illustrated in FIG. 1, the TMD operating in conjunction with a local video server may be designed and configured to further communicate with a video LAN and a wireless AP, which in the illustrative example provides down line receivers with demultiplexed video and audio transmission streams including synchronized signals necessary for the transmission of the video and audio content.

The present invention provides error correction for multicast sessions over a WLAN requiring only one WLAN unicast session/connection. In a public hot spot like an airport, a restaurant or a lobby of a hotel, it is possible to locate an intermediate device in such a way that the characteristics of the wireless channel are nearly identical for a group of user devices using for example, mobile terminals/mobile devices (MTs/MDs) co-located or in sight of each other. If, at least one unicast session/connection exists between the ID and one user device, then due to the inherent usage of the MAC ARQ mechanism, the quality of the transmission is good. The other user devices are then able to capture the traffic related to the unicast session without the need to effectively communicate with the ID. That is, additional unicast sessions need not be initiated or maintained.

A video source communications is broadcast towards an ID from e.g., a video server. It is assumed that the video source is a multicast/broadcast source where the destination IP packet discerns the broadcast/multicast IP address Ma1 of the multicast group M1. The ID blocks the packets until a user device expresses its intention to receive the broadcast/multicast data packets. The user device T1 initiates an application A1 that is ready to process incoming data packets relative to the multicast group M1. T1 sends an IGMP message towards the network (thus, to/through the ID) that is a request to be associated with the group M1. The ID receives the IGMP message and since this user device is the first element requesting association with the multicast group M1, the ID forwards the IP multicast data packets using as the MAC destination address (the MAC address of the user device) T1.

Normally, a multicast IP address is converted to a multicast Ethernet MAC address. An IEEE 802.11 user device processing a packet, determines whether the destination address is a multicast address. If the address is a multicast data packet then the user device cannot use the MAC ARQ mechanism. In the present invention, the multicast/broadcast data packets are encapsulated in Ethernet frames for transmission via a unicast session/connection. The inner IP data packet contains the unchanged IP multicast group address Ma1. The outer IP data packet contains the unicast destination address of user device T1. The user device T1 receives the IP data packets. In case of a transmission error, retransmission is possible through the IEEE 802.11 MAC ARQ mechanism.

A second terminal T2 initiates an application A2 that requests association with the same group M1. T2 first listens (T2 needs then to switch its wireless network interface card (NIC) into monitor mode in which all packets (whatever the destination address) are captured by the NIC and delivered to the upper layer (usually the driver)) by the channel dedicated to the video streaming and searches for a session carrying IP data packets for which the destination address corresponds to the multicast group address Ma1. Because such packets exist, T2 remains in monitor mode listening to the corresponding data packets. In case of packet loss, based on the assumption that the error distribution pattern is very close between neighbor user devices, user device T2 also receives the repeated packets sent from the ID to T1.

In the event that the unicast session is broken/ended because the user device disassociates (leaves the cell), there is a need for a mechanism to select/designate/locate a new unicast session user device (counterpart) for the ID. Once a new user device is located/chosen/designated, the ID forwards the video related data packets in unicast mode (i.e. the destination MAC address corresponds to the new selected unicast counterpart) to the newly selected/designated/located user device. The newly designated user device would normally be in monitor mode listening to all the incoming data packets relative to the IP multicast group (M1). Once the newly designated user device detects/determines that the data packets are addressed to itself (by scanning the IEEE 802.11 header), the user device switches to the normal mode (i.e. non-monitor mode) and processes the data packet normally. This switching should take place as quickly as possible in order to reduce the adverse visual effects that could be triggered by any delay in the switching.

The present invention can be adapted for other radio wireless LAN technology as Hiperian2. The present invention can also be adapted for cable networks and 3G cellular networks that support broadcast services. An ARQ mechanism at the MAC layer and the ability to switch between monitor mode and normal mode is all that is required for the present invention to operate with other wireless LAN technologies.

In an alternative embodiment that addresses the problem of the user device that is communicating via the unicast session leaving the cell, a dedicated terminal could be designated. The only function of the dedicated terminal is to run the MAC protocol. The ID establishes the unicast session with this dedicated terminal. Other/additional dedicated terminals may be located elsewhere in order to handle the multi-rate capability of the WLAN radio technology or to provide a back-up in the event that the first dedicated terminal fails. Several schemes are known in the art to detect failed terminals and switch to a back-up terminal.

The present invention has been described above as embedded in the ID. However, in an alternative embodiment the present invention may be implemented outside of the ID. Considering the ID a bridge, the multicast-to-unicast converter needs to be located on the same Local Area Network (LAN) as the ID. The multicast-to-unicast converter can, however, be located in the video server if the video server is unique or the multicast-to-unicast converter can be located in a separate and independent device.

The multicast-to-unicast converter is configured with two interfaces: one connecting the converter with the ID of the network and the other interface connecting the converter with the video server(s). The multicast-to-unicast converter functions in the following manner:

The converter blocks multicast/broadcast data packets coming from the video servers until an IGMP request is detected.

Upon receipt of a first IGMP request received from the network via the ID, the converter forwards the corresponding IP multicast data packet encapsulated into unicast Ethernet frames (for a unicast session) with a destination address corresponding to the source address of the received IGMP packet.

A drawback of an external multicast-to-unicast converter is that, being outside the ID, the converter has no knowledge of the MAC and does not know whether the unicast terminal is still available (i.e., if ARQ is running with that terminal or not). Only the ID has that knowledge. A solution to the problem is to use one or more (at least one) dedicated terminals known in advance by the converter. The dedicated terminal that is involved in the unicast MAC session with the ID sends a wake-up message regularly to the converter. If the converter does not receive such message after a predetermined time then the converter forwards the multicast/broadcast IP data packets to another dedicated terminal.

In a WLAN that offers multicast services, it is desirable to have multiple multicast sessions with different levels or qualities of service (QoS). For clients that can get clear signal from the WLAN ID, the multicast quality can be higher and at a higher rate. For clients that are, in general further from the ID and have poor reception, only a lower rate will be supported. For example, in IEEE 802.11b based WLAN, 4 different modulation schemes and thus rates are supported. The supported rates are 1 Mbps, 2 Mbps, 5.5 Mbps and 11 Mbps. Although not defined in the standard, some wireless LAN IDs limit the transmission rate for any multicast sessions to a fixed low rate on the premise that multicast clients may have drastically different reception quality and a low rate that can accommodate most clients should be chosen. There are no such restrictions on unicast sessions/connections. In the present invention, since multicast services are offered using unicast sessions/connections, multiple multicast (actually unicast) sessions each with different rates are easily supported. These rates are not statically allocated, but rather depend on whether there are clients that require and can support such rates. For example, if all clients are close to the ID, a multicast session with 5.5 Mbps may be supported. But if some clients move further away from the ID, a new "multicast" (actually a unicast) session at a lower rate e.g., 1 Mbps rate, may be initiated.

Figure 3:
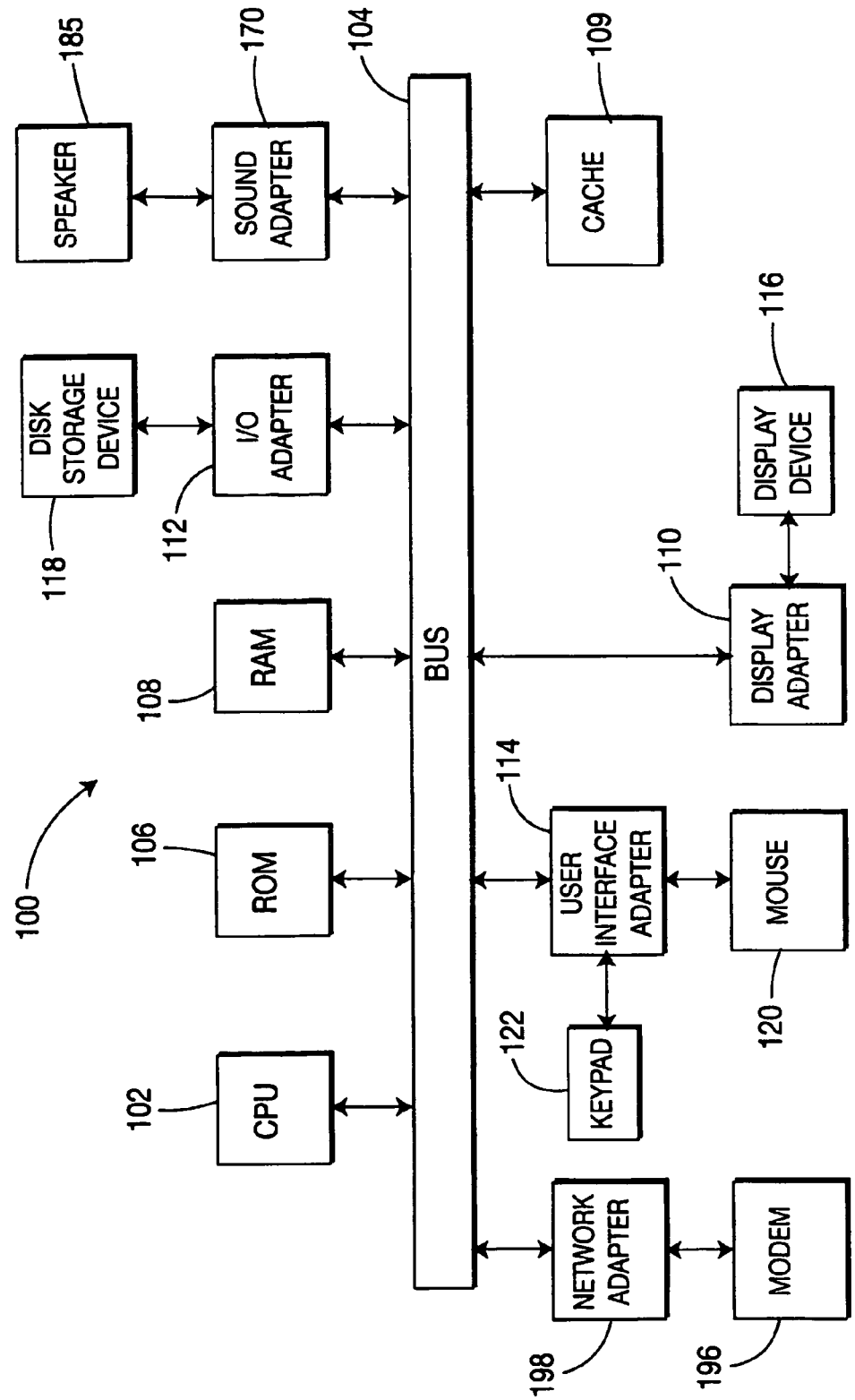
FIG. 3 is a block diagram of an exemplary system in which the present invention may be implemented.

FIG. 3 is a block diagram illustrating a computer system 100 to which the present invention may be applied, according to an illustrative embodiment of the present invention. The computer processing system 100 may be embodied in a mobile device used to access a cellular network or a WLAN. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter 170, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keypad/keyboard 122 are operatively coupled to system bus 104 by user interface adapter 114. The mouse 120 and keyboard 122 are used to input and output information to and from system 100.

At least one speaker (herein after "speaker") 185 is operatively coupled to system bus 104 by sound adapter 170.

A (digital and/or analog) modem 196 is operatively coupled to system bus 104 by network adapter 198.

Figure 4A:
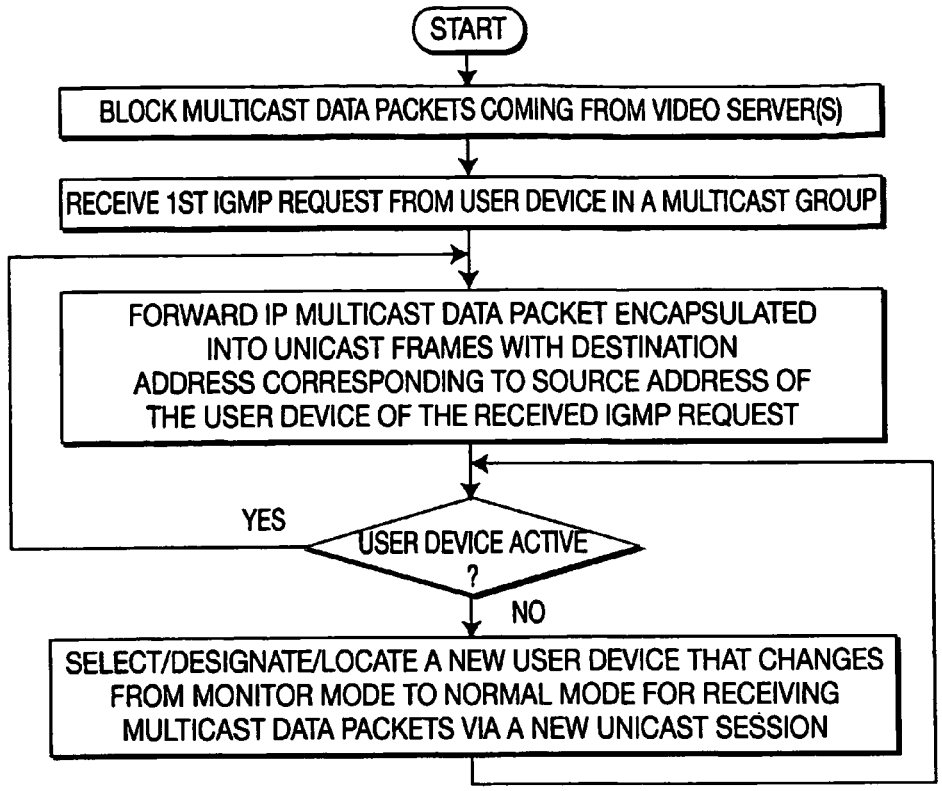
FIGS. 4A and 4B are flowharts illustrating the methods of the embodiments of the present invention.

FIG. 4A is a flowchart of the functions performed by a multicast-to-unicast converter in accordance with the present invention. In this embodiment of the present invention, the multicast-to-unicast converter is assumed to be embedded in the ID. The converter blocks multicast data packets coming from the video server(s) until a first IPMG request is received. Once the first IPMG request is received, then multicast data packets received from the network are encapsulated into Ethernet frames (for a unicast session) with a destination address corresponding to the source address of the received IGMP request. A test is then made periodically to verify that the user device is still active. If the user device is still active (the user device has not left the cell or failed) then multicast data packets continue to be forwarded. If, however, the user device is not still active (the user device has failed or left the cell) then a new user device must be located/selected/designated and the multicast data packets will be forwarded to the newly selected/designated/located user device. The user device will receive and process the data packets once the user device switches from monitor mode to normal mode.

Figure 4B:
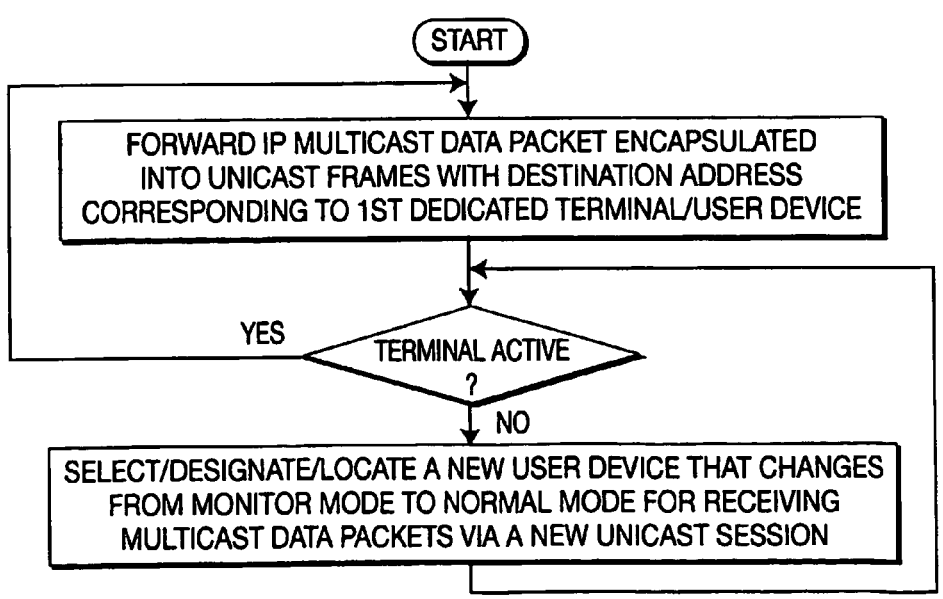

FIG. 4B is a flowchart of the functions performed by a multicast-to-unicast converter external to the ID. The main difference is receiving wake-up (watchdog timer) message or not. In this embodiment of the present invention, the multicast-to-unicast converter is assumed to be external to the ID. A dedicated terminal known in advance to the ID is used for the unicast session for receiving and processing multicast data packets. The multicast data packets encapsulated into Ethernet frames (for the unicast session) are forwarded to the dedicated terminal. A test is then made periodically to verify that the dedicated terminal is still active (wake-up message received). If the dedicated terminal is still active (the dedicated terminal has not failed—the wake-up message has been received) then multicast data packets continue to be forwarded. If, however, the dedicated terminal is not still active (the dedicated terminal has failed—the wake-up message has not been received) then a new dedicated terminal must be selected/designated and the multicast data packets will be forwarded to the newly selected/designated dedicated terminal. The newly selected dedicated terminal will receive and process the data packets once the newly selected dedicated terminal switches from monitor mode to normal mode. A dedicated terminal is used in this embodiment of the invention because the multicast-to-unicast converter would not otherwise have any knowledge of the MAC address since it is external to the LAN. A dedicated terminal would also be used when it is desirable to support multiple multicast (actually unicast) sessions/connections having different transmission rates.

It is to be understood that the present invention may be implemented in hardware, software or firmware or any combination thereof. It is to be further understood that, because some of the constituent system components and method steps depicted in the accompanying figures may be implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, although the invention is described in the context of IEEE 802.11 based WLANs, it is to be understood that the invention may be applied to structures based on other wireless LAN standards and formats that utilize the principles described above.

The invention claimed is:

1. A method for receiving a multicast transmission in user devices in a network, the method comprising:
    receiving, by an intermediate device, a request from a first user device to join a multicast group;
    identifying multicast data packets associated with said multicast group;
    monitoring transmissions of said multicast data packets from said intermediate device, by said first user device operating in monitor mode, to determine whether said identified multicast data packets are being transmitted between said intermediate device and a second user device in an already established unicast session between said second user device and said intermediate device, the already established unicast session comprising the multicast data packets encapsulated in frames for unicast transmission;
    capturing said multicast data packets by said first user device, without the need to communicate with the intermediate device, if said second user device is in said already established unicast session between said second user device and said intermediate device; and
    establishing a unicast session between said first user device and said intermediate device and switching to normal mode and processing multicast data packets by said first user device, if one of a) said second user device is not in said already established unicast session and b) said first user device is no longer in a coverage area for receiving transmissions between said second user device and said intermediate device.

2. The method according to claim 1, further comprising:
    testing to determine if said second user device is still active; and
    performing one of continuing to receive multicast data packets via one of said established unicast session and selecting a third user device by said intermediate device with which said intermediate device establishes a new unicast session.

3. The method according to claim 1, wherein said transmission of multicast data packets occurs in one of a wireless local area network, a cable network and a 3G cellular network that supports broadcast services.

4. The method according to claim 1, wherein all user devices in said multicast group operate in monitor mode except said user device that is active in said unicast session, said user device that is active in said unicast session operates in normal mode.

5. The method according to claim 1, wherein said request to join said multicast group is made via an Internet group management protocol request.

6. A method for receiving a multicast transmission in user devices in a network, the method comprising:
   establishing a unicast session between an intermediate device and a dedicated terminal, the unicast session comprising multicast data packets encapsulated in frames for unicast transmission;
   identifying multicast data packets associated with a multicast group;
   monitoring transmissions of said multicast data packets between said intermediate device and said dedicated terminal by user devices operating in monitor mode without the need to communicate with the intermediate device;
   testing to determine if a wake-up message is received from said dedicated terminal;
   if said wake-up message is received, continuing to receive multicast data packets via said already established unicast session, and if said wake-up message is not received, selecting another dedicated terminal by said intermediate device with which said intermediate device establishes a new unicast session; and
   processing said multicast data packets by said dedicated terminal.

7. The method according to claim 6, wherein said transmission of multicast/broadcast data packets occurs in one of a wireless local area network, a cable network and a 3G cellular network that supports broadcast services.

8. The method according to claim 6, wherein all user devices in said multicast group operate in monitor mode and said dedicated terminal operates in normal mode.

9. The method according to claim 6, wherein a plurality of unicast sessions are established in order to support multiple transmission rates.

10. The method according to claim 9, wherein said plurality of unicast sessions are between said intermediate device and a plurality of dedicated terminals.

11. The method according to claim 6, wherein said intermediate device is one of an access point, a bridge, a router and a brouter.

12. A multicast-to-unicast converter embedded in an intermediate device of a network;
   means for receiving, by said intermediate device, a request from a first user device to join a multicast group;
   means for identifying multicast data packets associated with said multicast group;
   means for monitoring transmissions of said multicast data packets from said intermediate device by said first user device without the need to communicate with the intermediate device to determine whether said identified multicast data packets are being transmitted between said intermediate device and a second user device in an already established unicast session between said second user device and said intermediate device, the unicast session comprising multicast data packets encapsulated in frames for unicast transmission;
   means for processing said multicast data packets by said second user device, if said second user device is in said already established unicast session between said second user device and said intermediate device; and
   means for establishing a unicast session between said first user device and said intermediate device and switching to normal mode and processing multicast data packets by said first user device, if one of a) said second user device is not in said already established unicast session and b) said first user device is no longer in a coverage area for receiving transmissions between said second user device and said intermediate device.

13. The apparatus according to claim 12, further comprising:
   means for testing to determine if said second user device is still active; and
   means for performing one of a) continuing to receive multicast data packets via said established unicast session and b) selecting another user device by said intermediate device with which said intermediate device establishes a new unicast session.

14. The apparatus according to claim 12, wherein said transmission of multicast data packets occurs in one of a wireless local area network, a cable network and a 3G cellular network that supports broadcast services.

15. The apparatus according to claim 12, wherein all user devices in said multicast group operate in monitor mode except said user device that is active in said unicast session, said user device that is active in said unicast session operates in normal mode.

16. The apparatus according to claim 12, wherein said request to join said multicast group is made via an Internet group management protocol request.

* * * * *